J. A. HOLIFIELD.
ELECTRIC CURRENT GENERATOR FOR ARC CIRCUITS.
APPLICATION FILED FEB. 17, 1920.

1,374,080.

Patented Apr. 5, 1921.

INVENTOR
JOSEPH. A. HOLIFIELD.
BY
ATTORNEY

UNITED STATES PATENT OFFICE.

JOSEPH A. HOLIFIELD, OF MOBILE, ALABAMA.

ELECTRIC-CURRENT GENERATOR FOR ARC-CIRCUITS.

1,374,080.  Specification of Letters Patent.   Patented Apr. 5, 1921.

Application filed February 17, 1920. Serial No. 359,418.

*To all whom it may concern:*

Be it known that I, JOSEPH A. HOLIFIELD, a citizen of the United States of America, residing at Mobile, in the county of Mobile and State of Alabama, have invented certain new and useful Improvements in Electric-Current Generators for Arc - Circuits, of which the following is a specification.

My invention relates to an apparatus for generating current of a character especially suited for electric welding and motion picture projecting machines. In such arts it is of primary importance that the current generated shall, at the point of consumption, maintain a substantially constant amperage with its voltage varying directly in proportion to the resistance or consumption of current at the arc or in the work circuit.

Referring first to my invention as applied to the art of electric welding, it has heretofore been the theory that the best results were obtained by the generation of a current in which the voltage and amperage will vary inversely to maintain a substantially constant wattage at the arc. Inasmuch as a variation in the amperes will produce a variation in the heat of the arc such systems must necessarily operate with a variable heat, and as a result the work is irregular comprising chills and burns, and moreover such an apparatus is not at all suited for overhead welding work where it is of vital importance that the heat in the arc be maintained constant for reliable work and safety for the workmen.

It is the purpose of my present invention by a simple and inexpensive mechanism to produce a current which has a practically constant amperage and a voltage which varies directly in proportion to the resistance in the arc.

In the art of motion picture projecting, it is of prime importance that the arc be caused to function with perfect regularity and uniformity as it seriously affects the work if there be fluctuations in the current. In this art, as in the prior welding art, a dead resistance has been interposed in the work circuit and it has been sought by means of this resistance, which is adjustable, to maintain a substantially constant flow of current across the arc, but such practice obviously involves a wasteful consumption of current in the dead resistance and also presents the problem of mechanically and instantaneously regulating the current to meet varying arc load conditions.

In all the foregoing arts and in others of similar character, it will be of obvious advantage to produce an apparatus which will automatically and electrically so govern itself and so function as to deliver to the arc or work circuit a constant current in which the amperage will be a constant factor and the voltage a variable factor in direct proportion to the load and this end I have accomplished in the simplest and most direct fashion by the utilization of a pair of similar dynamos, of the ordinary shunt wound or compound wound type, whose armatures are connected in series with each other and with the arc and both are driven by a common constant speed prime mover, either mechanical or electrical, causing one to function as a generator, and the other as a motor with its fields in series with the arc. In such an apparatus, it will be noted that no dead resistance needs to be interposed in the work circuit and as a result the load on the prime mover is the sum of the friction loads of the two machines and the resistance at the arc or the work circuit. It therefore follows that the prime mover need to be of but small power and inexpensive if a motor is used, and if the drive is from a line shaft but small power is consumed. This arrangement has a further advantage in that by reversing the connections of either dynamo or motor, or the brush leads of either, I convert the apparatus into a constant potential dynamo which will generate current having a voltage equal to the sum of the voltage generated by the two dynamos, in other words, I can thus convert a 55 volt welding outfit into a 110 volt constant potential dynamo for supplying a work circuit intended for the latter voltage.

In operation, before the arc is struck or the low voltage work circuit cut in, the coupled or connected dynamos are short circuited and one, functioning as a generator, will act to supply current while the other, functioning as a motor, generates a counter-electro-motive force which regulates the flow of current and creates a power in the motor itself which through its connection with the generator is returned thereto and thus becomes recovered energy so that no dead resistance losses obtain. In reality, one dynamo is actually functioning as a generator and driving the other as a motor, the counter E. M. F. of which will automatically regulate the flow of current so as to maintain its amperage approximately constant. On striking the arc or connecting the low voltage work circuit the counter E. M. F. of the motor will fall and the increased flow of current to the arc or work circuit will be in direct proportion to the resistance at the arc or the consumption in the work circuit, the amperage remaining substantially constant and the voltage varying. By such an arrangement, in contradistinction to the motor generator set, the prime mover or source of power for driving the coupled dynamos may be of any character and the apparatus functions as a self contained unit wholly disconnected from any source of electrical energy.

As illustrative of embodiments of my invention which I have successfully operated, reference is made to the accompanying drawings, in which:—

Similar reference numerals refer to similar parts throughout the drawings.

Figure 1:
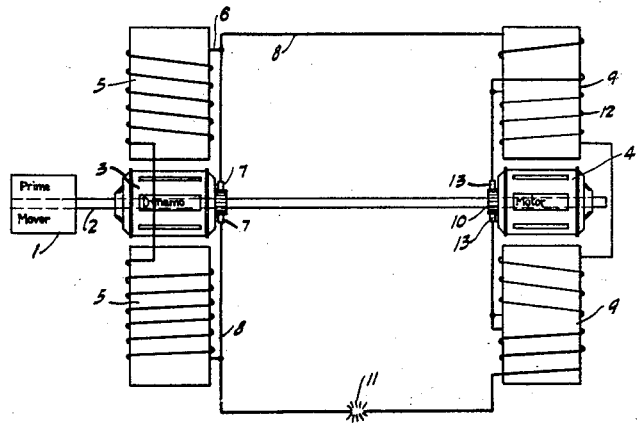
Figure 1 illustrates diagrammatically a welding system embodying my invention.

As illustrated in Fig. 1, I show a prime mover 1 of any type or character driving a shaft 2, which in turn drives two dynamos diametrically illustrated at 3 and 4, the dynamo 3 being of a simple shunt wound type adapted to function as a generator and the dynamo 4 being of a compound wound type and adapted in my system to function as a motor. As illustrated, the fields 5 of the generator 3 are connected in a shunt circuit 6 across its brushes 7, and these brushes supply current to the main power circuit 8. The fields 9 of the motor 4 are wound in series with the main circuit 8 and also in series with its armature 10 and the arc 11, the electrodes of which are of any suitable character and are adjustable in the manner well understood in this art. The fields 9 also have a shunt winding 12 connected in shunt across its brushes 13 and wound to boost the action of the series windings.

Assuming that the shaft 2 is driven at a constant speed, before drawing the arc, the apparatus functions as follows: The generator 3, as it is driven by the shaft 2, will generate a constant potential current flowing through the circuit 8, and the motor 4, being similarly driven, will generate a counter E. M. F. which will buck the flow of current from the generator, permitting only a predetermined flow of current of the desired amperage to return through circuit 8 to the generator. The energy derived from the current passing through the motor is converted into mechanical energy and returned through the shaft 2 to the prime mover so that only the energy required to overcome the friction load of the apparatus is lost. The windings 9 and 12 in the motor fields are connected collectively so as to boost each other and under such conditions the bucking effect of the counter E. M. F. of the motor armature is increased by the joint action of the two windings. Instead of a dead resistance the motor thus forms a live resistance and the energy required to regulate the current is converted back into energy in the generator and thus the total consumption in the circuit is equal to the friction load of the two machines which is very small as the machines used in my apparatus were two four kilowat dynamos driven by a five horse power prime mover. The current consumption with the apparatus short circuited showed only a friction load on the prime mover. Upon drawing the arc, the load increased with the length of the arc until it settled at the normal working arc and consumption in the arc then was about five horse power. As the arc was drawn the increased resistance at the arc weakens the motor and reduces the counter E. M. F, thereby increasing the flow of the current to compensate the increased resistance at the arc, and this compensation or regulation is instantaneous and automatic and functions to hold the amperage substantially constant and the voltage varying in direct proportion to the resistance at the arc. The generating apparatus described being a self contained unit may be driven from a line shaft or by any mechanical or electrical drive of constant speed that may be available, thus rendering the apparatus extremely convenient for installation and capable of a wide range of usefulness.

Figure 2:
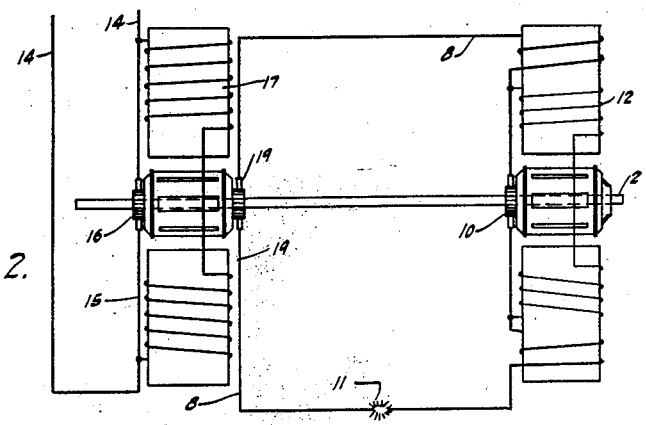
Fig. 2 illustrates a modification of my invention in which a dynamotor is utilized to perform the joint functions of the prime mover and the generator, and is especially adapted for motion picture arc circuits.
Figure 3:
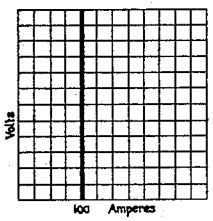
Fig. 3 is a curve illustrating current and voltage relations in a constant energy system.

In Fig. 2 I show a modification of the apparatus more particularly suited for the arcs of motion picture projecting machines. Here constant potential D. C. current is derived from a supply circuit 14 and delivered to a dynamotor 15 of which the motor side has a commutator 16, the brushes of which are in series in the supply circuit 14 and the field coils 17 of which are in shunt to the supply circuit. On the generator side the commutator 18 has its brushes 19 connected in series with the work circuit 8, as in Fig. 1, and this circuit includes the motor 4 and its field windings, all as heretofore described, with the motion picture arc in series with the circuit 8 and the motor. Both the motor and the dynamotor are fast on the common shaft 2 and the operation is the same as heretofore described. This arrangement is very compact and less expensive than where a separate prime mover is used.

In both arrangements, as the arc is drawn and the counter E. M. F. drops, the shunt coils 12, being connected in shunt across the brushes 13, will vary proportionately. By this arrangement I hold the amperage constant at the arc, as will be seen by reference to the curve, Fig. 5, where assuming that the machine is adapted to weld with an arc of 100 amperes it will be observed that throughout the elastic range of the arc the amperage is practically a constant factor and the voltage is a variable proportionate to the resistance in the arc. Of course the maintenance of strictly unvarying amperage is impossible but for all practical welding purposes the amperage is a constant factor in the operation of my apparatus and as a result the regulation being automatic and the current consumption practically equal to the resistance in the arc, my apparatus can be operated with less skill and at less expense and can be constructed with less cost than any equipment now available.

Figure 4:
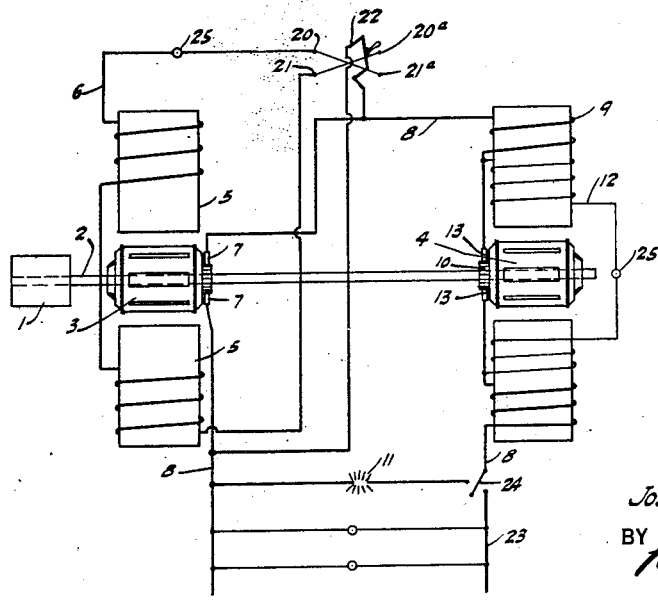
Fig. 4 illustrates my apparatus convertible to generate low or high voltage current for different uses.

In Fig. 4 the field circuit 6 is connected to the switch terminals 20 and 21 of a double throw switch 22 having opposite terminals 20ª and 21ª. The terminals 20 and 21ª are cross connected and terminals 21 and 20ª are cross connected, thereby causing the current to be reversed in the dynamo fields by reversing the switch which itself is connected by the leads 22 and 23 across the circuit 8. Here the arc 11 is in a circuit 8ª and 23 is a work circuit. A switch 24 controls the connection of circuit 8ª or 23 with the circuit 8. Rheostats 25 may be used in the circuits 6 and 12.

In operation, assuming each dynamo 3 and 4 is designed to generate a 55 volt D. C. current, by throwing switch 22 to cause generator 4 to function as a motor and throwing switch 24 to close the arc circuit 8ª, the apparatus will function exactly as described in connection with Fig. 1, but on reversing the switch 22 and closing the work circuit 23 (which opens the arc circuit 8ª), the two dynamos are converted into a constant potential dynamo which will generate current of twice the voltage of the arc circuit, i. e., the two dynamos generate 110 volt current suitable for lights and other uses for which factories and plants are generally equipped. This convertibility of my apparatus to generate a low or high voltage greatly increases its range of usefulness.

It is understood that the amperage desired at the arc may be varied by varying the resistance inserted in the shunt fields of the generator or motor or both as is customary in present practice.

This invention is not intended to be restricted in scope to the specific embodiments shown, but contemplates such modifications as come within the spirit and scope of the claims.

Having thus described my invention, what I claim as new and desire to secure by Letters Patent, is:—

1. The hereindescribed current generating apparatus for arcing circuits, which comprises a motor and a generator driven synchronously and at a substantially constant speed, the fields of the motor and the arc being in series with the armatures of both generator and motor, and the fields of the generator being in shunt to its armature, substantially as described.

2. The hereindescribed current generating apparatus for arcing circuits, which comprises a substantially constant speed prime mover, and a motor and a generator driven thereby, the fields of the motor and the arc being in series with the armatures of both generator and motor, and the fields of the generator being in shunt to its armature, substantially as described.

3. The hereindescribed current generating apparatus for arcing circuits, which comprises a substantially constant speed prime mover, and a motor and a generator driven thereby, the fields of the motor and the arc being in series with the armatures of both generator and motor, and the fields of the generator being in shunt to its armature, and a field winding for the motor in shunt to its armature and adapted to boost the series field windings of the motor.

4. An apparatus for generating current for arc circuits, which comprises a generator and a motor, a source of power direct connected to the armatures of both machines and adapted to drive them at a substantially constant speed, an arcing circuit in series with armatures of both machines and with the field coils of the motor, and shunt wound fields for the generator.

5. An apparatus for generating current for arc circuits, which comprises a generator and a motor of substantially equal capacity, a source of power direct connected to the armatures of both machines and adapted to drive them at a substantially constant speed, an arcing circuit in series with armatures of both machines and with the field coils of the motor, and shunt wound fields for the generator and motor, the shunt winding in the motor field being adapted to boost its series winding.

6. In an apparatus for generating current for an arc circuit, a prime mover having a substantially constant speed, a shaft driven thereby, an electric generator and an electric motor of substantially equal capacity having their armatures driven by said shaft, field windings for the generator and motor in shunt with their respective armatures, and an arcing circuit in series with the armatures of both motor and generator and in series with the field coils of the motor which are wound to boost its shunt windings.

7. In combination, two dynamos driven synchronously and having armatures connected in series with the fields of one and with a work circuit, the fields of the other being shunt wound, and means to reverse the magnetism in the fields of one dynamo to change the voltage in the work circuit.

8. In combination, two dynamos driven synchronously and having armatures connected in series with the fields of one and with a work circuit, the fields of the other being shunt wound, means to reverse the magnetism in the fields of one dynamo to change the voltage in the work circuit, said work circuit comprising two branches, one a low voltage arc circuit and the other a high voltage work circuit, and switch means to connect the desired branch circuit to the work circuit.

In testimony whereof I affix my signature.

JOSEPH A. HOLIFIELD.

Witness:
NOMIE WELSH.